(12) United States Patent
Fahn et al.

(10) Patent No.: US 8,897,555 B2
(45) Date of Patent: Nov. 25, 2014

(54) VIDEO SEARCHING METHOD

(75) Inventors: Chin-Shyurng Fahn, Taipei (TW); Bo-Yuan Su, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 167 days.

(21) Appl. No.: 13/559,956

(22) Filed: Jul. 27, 2012

(65) Prior Publication Data

US 2013/0028512 A1 Jan. 31, 2013

(30) Foreign Application Priority Data

Jul. 28, 2011 (TW) .............................. 100126820 A

(51) Int. Cl.
*G06K 9/00* (2006.01)
*G06F 17/30* (2006.01)

(52) U.S. Cl.
CPC ................................ *G06F 17/30784* (2013.01)
USPC ......................................................... 382/165

(58) Field of Classification Search
CPC ................... G06T 7/2013; G06T 2207/10016;
G06F 17/212; G06F 17/241; G06F 17/30017;
G06F 17/30787; G06F 17/30796; G06F 17/30802; G06F 17/30811; G06F 17/30817;
G06F 17/30864; H04N 5/4401; H04N 7/17336; H04N 21/23439; H04N 21/26603;
H04N 21/278; H04N 21/41407; H04N 24/4622; H04N 21/47202; H04N 21/4782;
H04N 21/4828; H04N 21/6587; H04N 21/84;
H04N 21/8586; Y10S 707/915; Y10S 707/916; Y10S 707/943; Y10S 707/99945
See application file for complete search history.

(56) References Cited

U.S. PATENT DOCUMENTS

| | | | | |
|---|---|---|---|---|
| 6,370,543 | B2 * | 4/2002 | Hoffert et al. ................. | 725/113 |
| 6,597,738 | B1 * | 7/2003 | Park et al. ................ | 375/240.16 |
| 7,149,957 | B2 * | 12/2006 | Hull et al. ...................... | 715/200 |
| 8,479,238 | B2 * | 7/2013 | Chen et al. ...................... | 725/86 |
| 2010/0250585 | A1 | 9/2010 | Hagg et al. | |

FOREIGN PATENT DOCUMENTS

| | | |
|---|---|---|
| TW | 200411433 A | 7/2004 |
| TW | 200521828 A | 7/2005 |
| TW | 2005522707 A | 7/2005 |

OTHER PUBLICATIONS

Notice of Allowance in corresponding Taiwanese Application No. 100126820, dated Nov. 27, 2013 with English translation.

\* cited by examiner

*Primary Examiner* — Jose Couso
(74) *Attorney, Agent, or Firm* — Bacon & Thomas, PLLC

(57) ABSTRACT

A video searching method includes: providing a database for storing the data of a video, wherein the data of the video includes the colors of at least a key frame; providing a searching interface for an user uploading a key picture; providing a recording unit for recording the colors of the key picture; providing a performing unit for comparing the colors of the key frame and the key picture to judge whether a similar color exists; the performing unit computing the value of the colors if there exists a similar color; the performing unit sifting the video by comparing a threshold value and the value of the colors; and the performing unit sorting the video by the value of the colors to obtain a result list. By comparing the value of the colors between the key picture and the key frame, the result list is simply and quickly obtained.

10 Claims, 17 Drawing Sheets

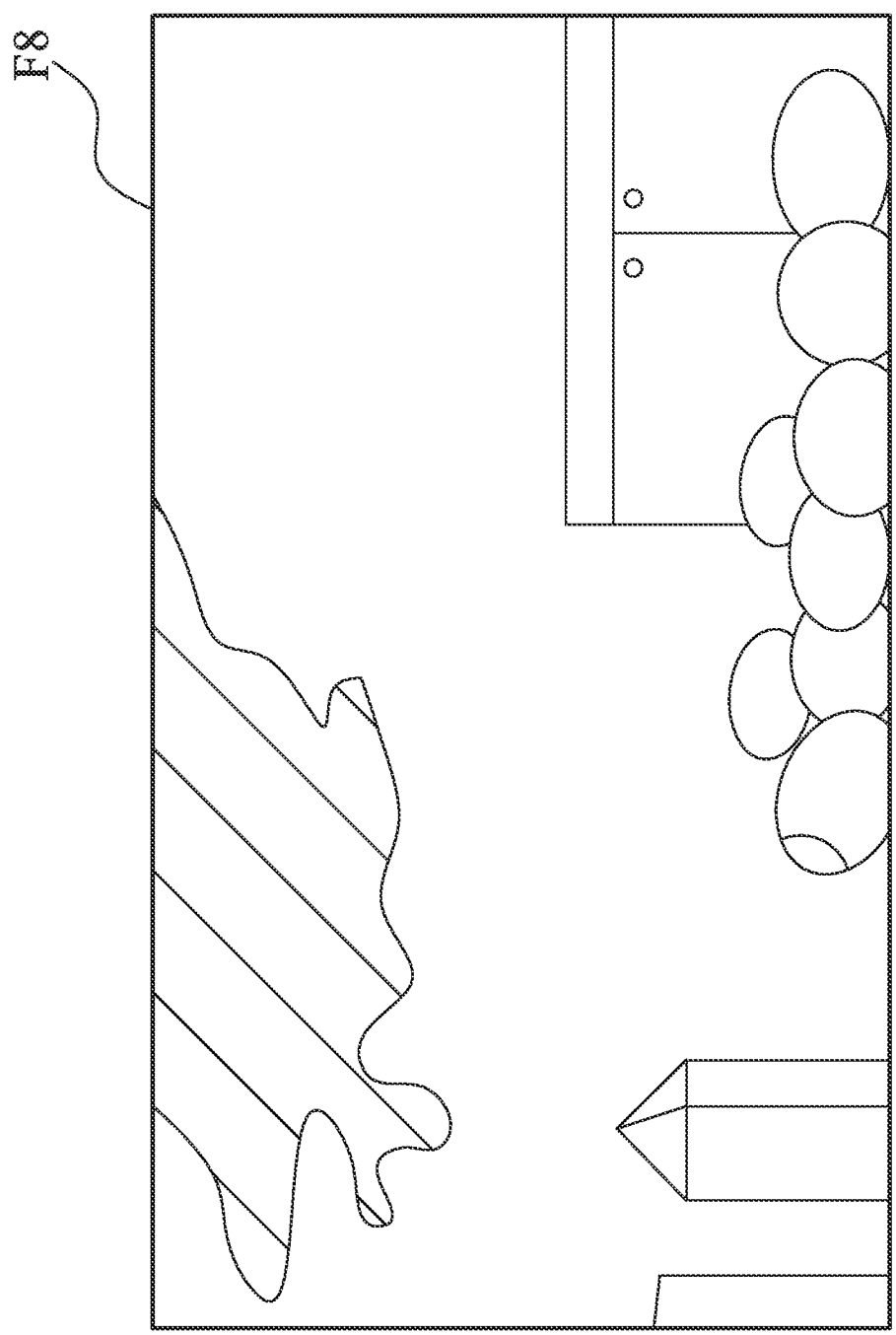

|  | The maximal proportion of similar color counts (A) | The maximum of similar color counts (B) | The average value of similar color counts (C) | The average proportion of similar color counts (D) |
|---|---|---|---|---|
| Video1 | 98.257 | 2,802 | 1,052 | 21.32 |
| Video2 | 95.321 | 3,257 | 722 | 30.25 |
| Video3 | 82.514 | 2,203 | 421 | 15.25 |
| Video4 | 73.655 | 2,535 | 435 | 12.22 |
| Video5 | 57.365 | 1,505 | 212 | 9.52 |
| Video6 | 30.521 | 1,020 | 175 | 5.55 |
| Video7 | 22.213 | 572 | 52 | 2.32 |

FIG. 7A

|  | The maximal proportion of similar color counts (A) | The maximum of similar color counts (B) | The average value of similar color counts (C) | The average proportion of similar color counts (D) |
|---|---|---|---|---|
| Video1 | 100 | 2,802 | 1,052 | 21.32 |
| Video2 | 100 | 3,257 | 722 | 30.25 |
| Video3 | 100 | 2,203 | 421 | 15.25 |
| Video4 | 100 | 2,535 | 435 | 12.22 |
| Video5 | 100 | 1,505 | 212 | 9.52 |
| ~~Video6~~ | ~~0~~ | ~~1,020~~ | ~~175~~ | ~~5.55~~ |
| ~~Video7~~ | ~~0~~ | ~~572~~ | ~~52~~ | ~~2.32~~ |

FIG. 7B

|  | The maximal proportion of similar color counts (A) | The maximum of similar color counts (B) | The average value of similar color counts (C) | The average proportion of similar color counts (D) |
|---|---|---|---|---|
| Video1 | 100 | 3,257 | 722 | 30.25 |
| Video2 | 100 | 2,802 | 1,052 | 21.32 |
| Video3 | 100 | 2,535 | 435 | 12.22 |
| Video4 | 100 | 2,203 | 421 | 15.25 |
| Video5 | 100 | 1,505 | 212 | 9.52 |
| ~~Video6~~ | ~~0~~ | ~~1,020~~ | ~~175~~ | ~~5.55~~ |
| ~~Video7~~ | ~~0~~ | ~~572~~ | ~~52~~ | ~~2.32~~ |

FIG. 7C

| | The maximal proportion of similar color counts (A) | The maximum of similar color counts (B) | The average value of similar color counts (C) | The average proportion of similar color counts (D) |
|---|---|---|---|---|
| Video1 | 100 | 3,000 | 1,052 | 21.32 |
| Video2 | 100 | 3,000 | 722 | 30.25 |
| Video3 | 100 | 3,000 | 435 | 12.22 |
| ~~Video4~~ | ~~100~~ | ~~2,000~~ | ~~421~~ | ~~15.25~~ |
| ~~Video5~~ | ~~100~~ | ~~2,000~~ | ~~212~~ | ~~9.52~~ |
| ~~Video6~~ | ~~0~~ | ~~1,000~~ | ~~175~~ | ~~5.55~~ |
| ~~Video7~~ | ~~0~~ | ~~1,000~~ | ~~52~~ | ~~2.32~~ |

FIG. 7D

| | The maximal proportion of similar color counts (A) | The maximum of similar color counts (B) | The average value of similar color counts (C) | The average proportion of similar color counts (D) |
|---|---|---|---|---|
| Video1 | 100 | 3,000 | 1,000 | 21.32 |
| Video2 | 100 | 3,000 | 1,000 | 30.25 |
| Video3 | 100 | 3,000 | 0 | 12.22 |
| Video4 | 100 | 2,000 | 0 | 15.25 |
| Video5 | 100 | 2,000 | 0 | 9.52 |
| Video6 | 0 | 1,000 | 0 | 5.5 |
| Video7 | 0 | 1,000 | 0 | 2.32 |

FIG. 7E

|  | The maximal proportion of similar color counts (A) | The maximum of similar color counts (B) | The average value of similar color counts (C) | The average proportion of similar color counts (D) |
|---|---|---|---|---|
| Video1 | 100 | 3,000 | 1,000 | 30.25 |
| Video2 | 100 | 3,000 | 1,000 | 21.32 |
| Video3 | 100 | 3,000 | 0 | 12.22 |
| ~~Video4~~ | ~~100~~ | ~~2,000~~ | ~~0~~ | ~~15.25~~ |
| ~~Video5~~ | ~~100~~ | ~~2,000~~ | ~~0~~ | ~~9.52~~ |
| ~~Video6~~ | ~~0~~ | ~~1,000~~ | ~~0~~ | ~~5.55~~ |
| ~~Video7~~ | ~~0~~ | ~~1,000~~ | ~~0~~ | ~~2.32~~ |

FIG. 7F

VIDEO SEARCHING METHOD

BACKGROUND OF THE INVENTION (1) Field of the Invention

The invention relates to a method for searching multimedia, and especially relates to a method for searching videos by a key picture.

(2) Description of the Prior Art

With quick development of technology, many kinds of network searching engines have emerged. As network bandwidth increases, a lot of video sharing or searching platforms appear, such as YouTube®, which help users search and watch videos more conveniently.

However, in existing technology, searching engines usually use names or key words as searching cues, completely depending on words of the video. It is inconvenient for users because if users do not know the words, they are not able to search. If a picture is used for searching, we need to use complex calculations to compare the picture with each frame of the video, which definitely consumes lots of execution time. Previous technology also introduces a searching method using key frames, but it still requires complex calculations. Thus, existing searching engines cannot quickly search the desired video based on pictures.

Therefore, how to provide a simple video searching method and reduce searching time is a problem to be solved in the field.

SUMMARY OF THE INVENTION

The object of the invention is to provide a video searching method, for users who can simply and quickly search for the desired video in the uploaded videos according to a key picture.

In one aspect, the invention provides a video searching method, comprising the steps of: providing a database for storing at least one video therein, wherein each the video comprises at least a key frame, and each the key frame comprises one or more source colors called "F colors"; providing a searching interface for an user uploading a key picture, wherein the key picture comprises one or more source colors called "P colors"; providing a recording unit for recording the P colors of the key picture; providing a performing unit for comparing the P colors and the F colors to determine a similar color count counted by the total amount of similar colors in the P colors and the F colors and a proportion of the similar color count which is determined by the ratio of the similar color count to the amount of F colors; if the similar color count and the proportion of the similar color count are lager than zero, the performing unit generating a statistical list comprising a maximum of the similar color counts, a maximum of the proportions of the similar color counts, an average value of the similar color counts and an average value of the proportions of the similar color counts of the videos; the performing unit sifting out one or more sifted videos from the statistical list according to the maximum of the similar color count and the maximum of the proportion of the similar color count; after sifting out the sifted videos, then the performing unit sorting the sifted videos in order by the average value of the similar color counts and the average value of the proportions of the similar color counts to obtain a result list; and providing a display interface for displaying the result list.

In an embodiment, the steps of the performing unit sifting out the sifted video comprise: providing a threshold value; keeping the video listed in the statistical list if the maximum of the proportions of the similar color counts is larger than the threshold value, else deleting the video from the statistical list; providing a dynamic threshold value for one or more kept videos sifted out through the threshold value; and keeping the kept videos in the statistical list if the maximum of the similar color counts is larger than the dynamic threshold value, else deleting the video from the statistical list.

In an embodiment, the video searching method further comprises steps of: providing an uploading interface for a user to upload the video; providing a picking unit for picking one or more key frames in the uploaded video; and providing a recording unit for recording the F colors of the key frames and storing the F colors in the database. In an embodiment, the video searching method further comprises steps of: providing a conversion unit for converting the uploaded video into a network video format, and transforming the key frames into an unified format. Besides, if users do not upload, then the number of videos stored in the database is zero, and the result list is displayed as zero.

In an embodiment, if the similar color count and the proportion of the similar color count are zero after comparing the P colors and the F colors, the result list is displayed as zero. Besides, the performing unit sifting out the sifted videos from the statistical list comprises a step of: if the performing unit deletes all videos from the statistical list, then the result list is displayed as zero.

In an embodiment, each the video has a plurality of key frames, each frame corresponds to one similar color count and one proportion of the similar color count. Accordingly, the maximum of the similar color counts is defined as a count maximal among the similar color counts of the key frames, and the maximum of the proportions of the similar color counts is defined as a proportion maximal among the proportions of the similar color counts of the key frames, and the average value of the similar color counts is generated by computing an average value of the similar color counts for all of the key frames, and the average value of the proportions of the similar color counts is generated by computing an average value of the proportions of the similar color counts for all of the key frames.

In an embodiment, if the uploaded video has only one key frame, the maximum of the similar color counts is equal to the average value of the similar color counts, and the maximum of the proportions of the similar color counts is equal to the average value of the proportions of the similar color counts.

In an embodiment, the uploaded video may have one or more relevant video stored in the database. Both the video and the relevant video have a same name or a same key word. And the step of displaying the result list on the display interface comprises: the performing unit searching out the relevant video from the database through the same name or the same key word, so that the relevant video is listed in the result list.

In an embodiment, before comparing the P colors and the F colors, the performing unit converts the F colors and the P colors into a simplified data according to a specific quantization function.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

FIG. 6A and FIG. 6B are schematic views of the frames with a similar area in an embodiment of the invention.

FIG. 7A to FIG. 7F are schematic views of the process showing how to sift and sort plural compared videos in the statistical list.

DESCRIPTION OF THE PREFERRED EMBODIMENTS

It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected" and "coupled," and variations thereof herein are used broadly and encompass direct and indirect connections, couplings, and mountings.

The present invention provides a video searching method, which is used on the internet platform for users to simply and quickly search the desired video from the uploaded videos according to a key picture. The present invention uses a computer or a mobile communication device to run searching software. For searching the videos, users can operate the computer or the mobile communication device, initiate the searching interface provided by the searching software and upload the key picture to the internet platform. On the other hand, if users want to share videos, they can use an uploading interface in the searching software to upload the videos to a database which is set up on the internet platform by means of the searching software.

Especially, in the embodiment, the video which is stored in the database is not limited to store in the database. For example, though the video is actually stored in another device, its information like address is recorded in the database on the internet platform, so the video searching method still can be provided to connect to the other device through the database to pick up the data of the video such as colors.

Figure 1:
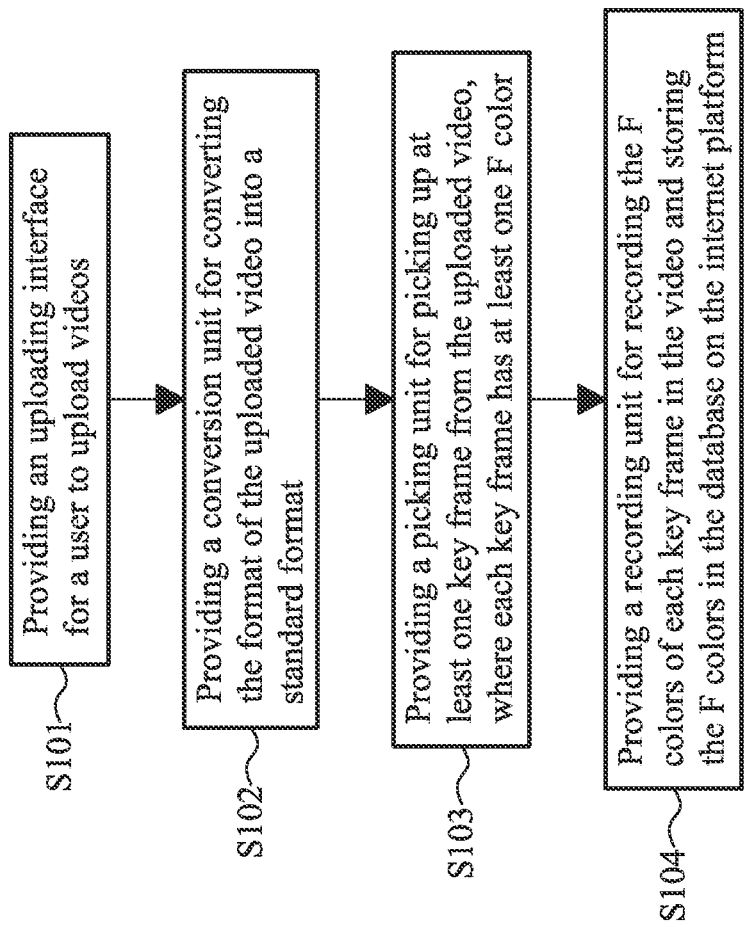
FIG. 1 is a flow chart of uploading the video to an internet platform in an embodiment according to the invention.

First of all, FIG. 1 shows uploading the video to an internet platform to store the data of the video so as to build the database, and the steps includes:

Step S101: providing an uploading interface for a user to upload one or more videos, and each of the videos includes one or more key frames.

Step S102: providing a conversion unit for converting the uploaded video into a standard format, such as the Flash Video (FLV) format. Since now videos have diversified formats and not all formats can work on any player, the conversion unit first converts the uploaded video into the FLV format and then stores it in the database.

Step S103: providing a picking unit for picking up at least one key frame from the uploaded video, where each key frame has at least one F color. For a video is composed of many continuous frames, for instance, a 5-minute video may be composed of 6,000 frames, if colors of all these 6,000 frames are analyzed one by one, the searching time will be much longer. Therefore, the picking unit picks up some of the frames for further analysis. The embodiment of the present invention uses the picking unit to pick up at least one key frame from each of the uploaded videos. In a preferable embodiment, the key frames is transformed into an unified format after being picked, such as an unified resolution or unified height and width, to accelerate follow-up operations.

Figure 2A:
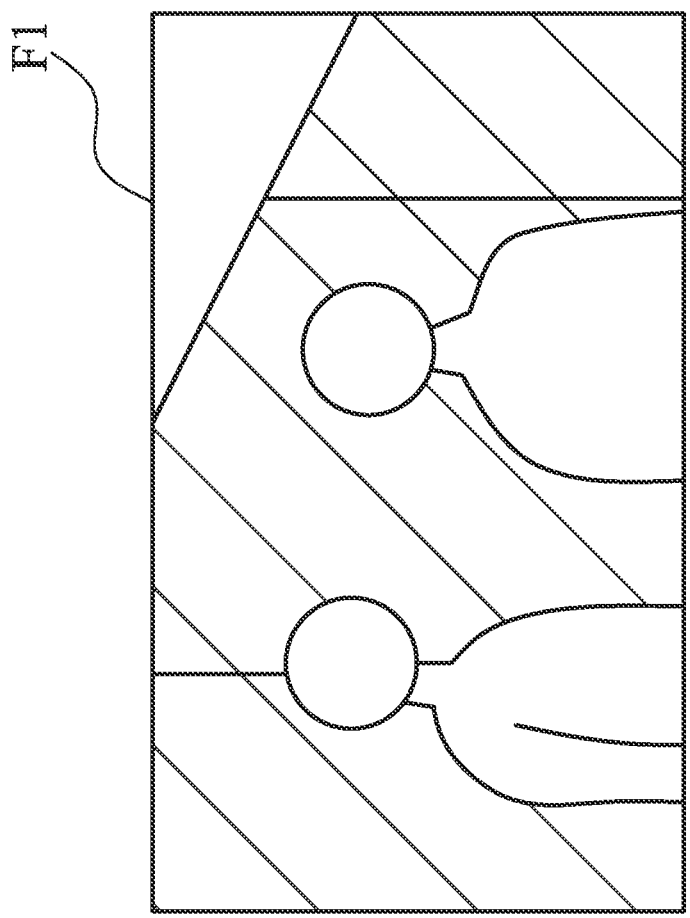
FIG. 2A to FIG. 2C and FIG. 3A to FIG. 3C are schematic views of the frames in an embodiment of the video according to the invention.
Figure 2B:
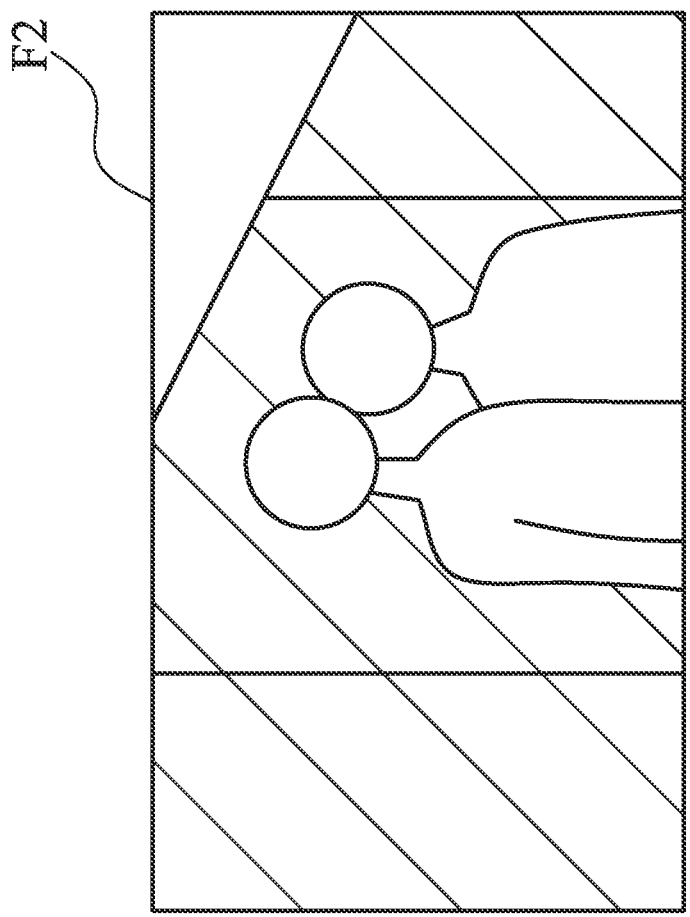
Figure 2C:
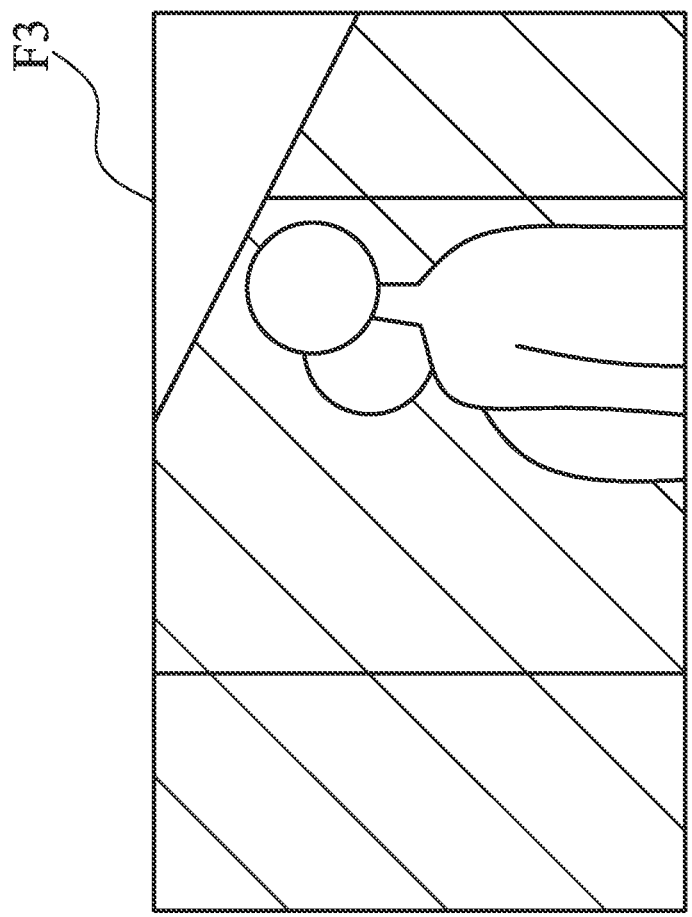

Refer to FIG. 2A to FIG. 2C, which are schematic views of the frames in an embodiment of the video according to the present invention. Frames F1, F2 and F3 are shown in FIG. 2A to FIG. 2C sequentially. We can see that although pictures in the frames F1, F2 and F3 are not the same, they are continuous and do not have many differences. Thus, the picking unit can select one of the three frames for color analysis and further as one of the key frames of the video. The key frame is one of the main pictures of the uploaded video, and the uploaded video is compressed with reference to the key frame. The key frame is compressed independently, and other frames are compressed or decoded referring to the key frame.

Figure 3A:
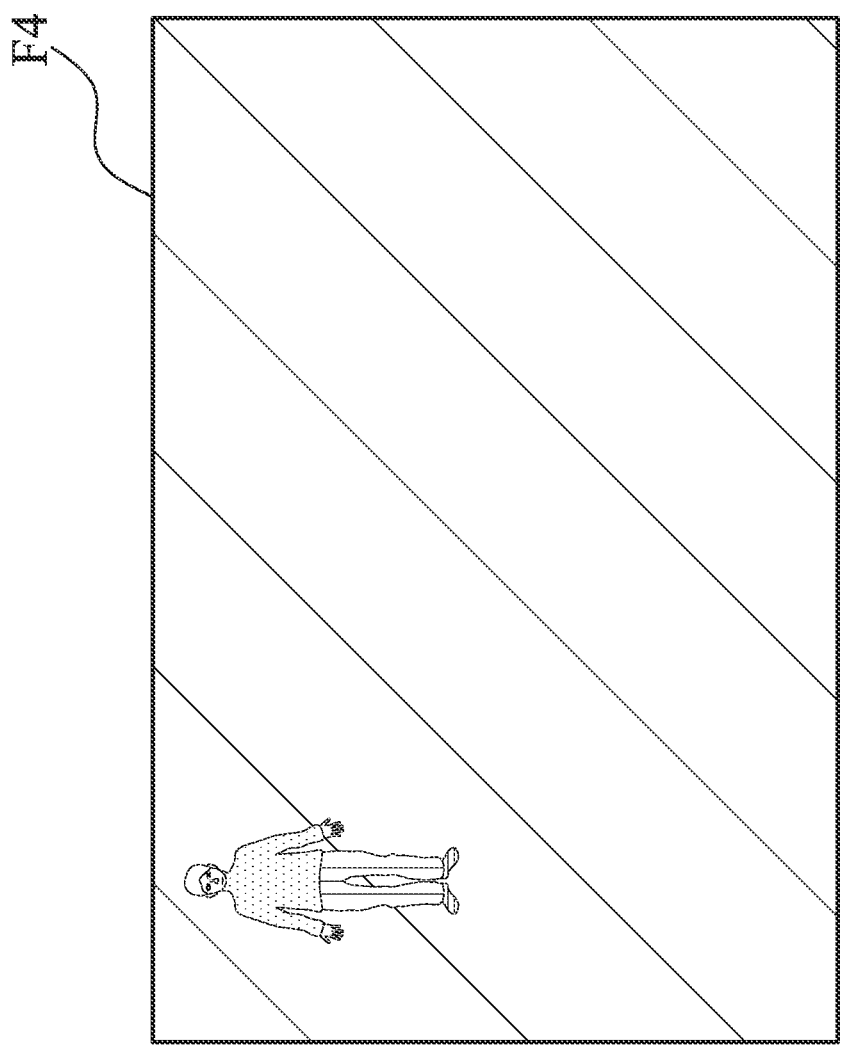
Figure 3B:
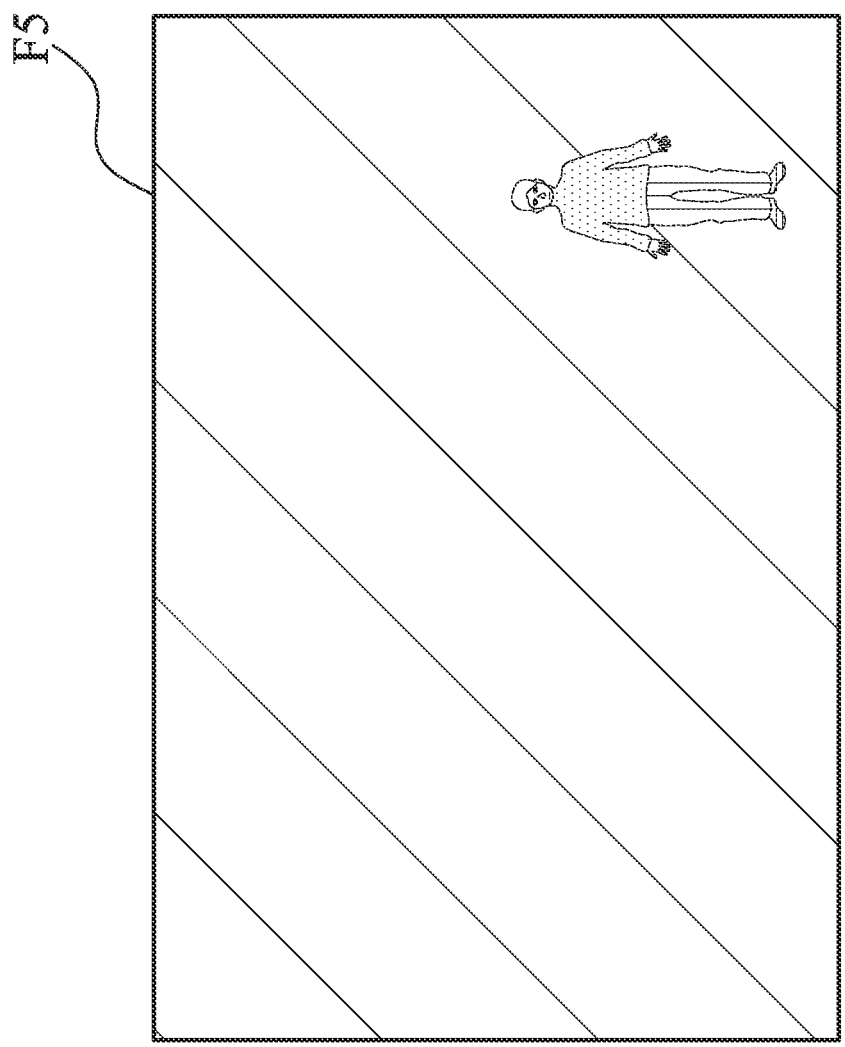
Figure 3C:
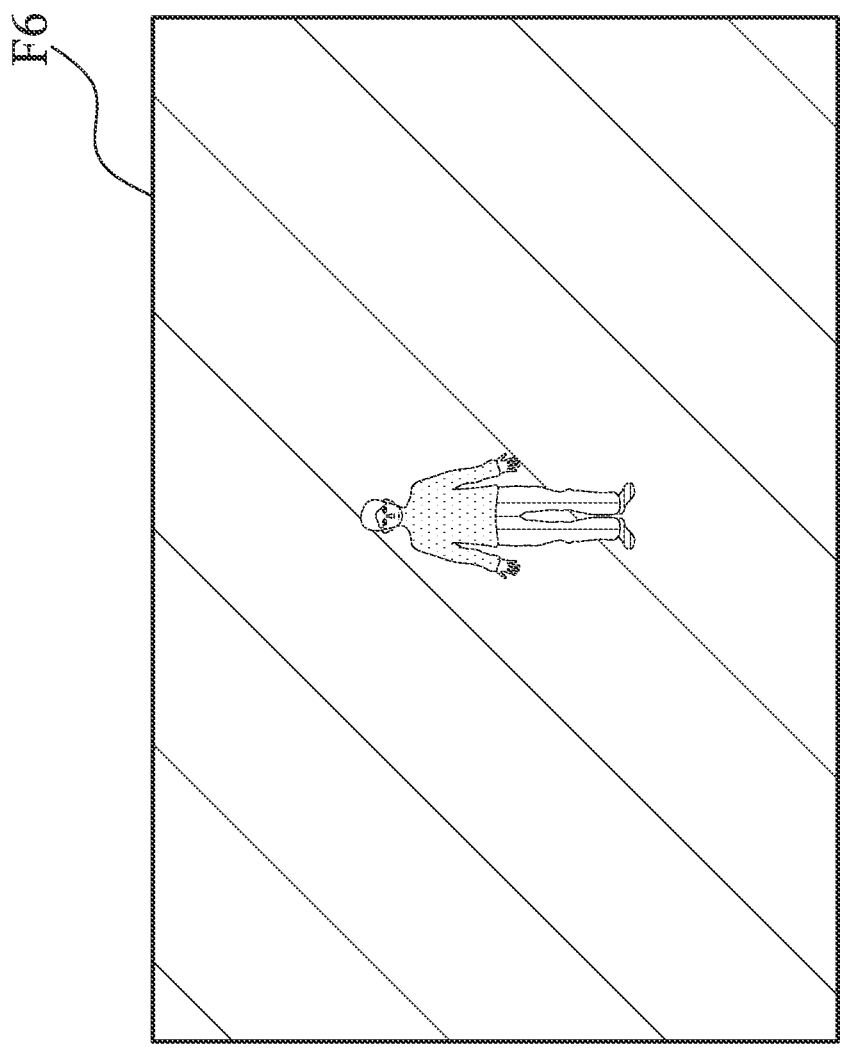

Step S104: providing a recording unit for recording the F colors of each key frame in the video and storing the F colors in the database on the internet platform. The F colors are represented only by values of the source colors in the key frames without regard to the positions of the source colors. As shown from FIG. 3A to FIG. 3C, no matter what position people in the frames F4 to F6 are displayed, the values of the source colors do not change too much. Therefore, one of the frames F4 to F6 is selected as the key frame to store the F color.

With other users sharing, the uploading step is done to build the database for users to further search videos. Moreover, if the database does not have colors of any videos, the result list is zero and an instruction like "Cannot find any similar video" is shown on the display interface.

Figure 4:
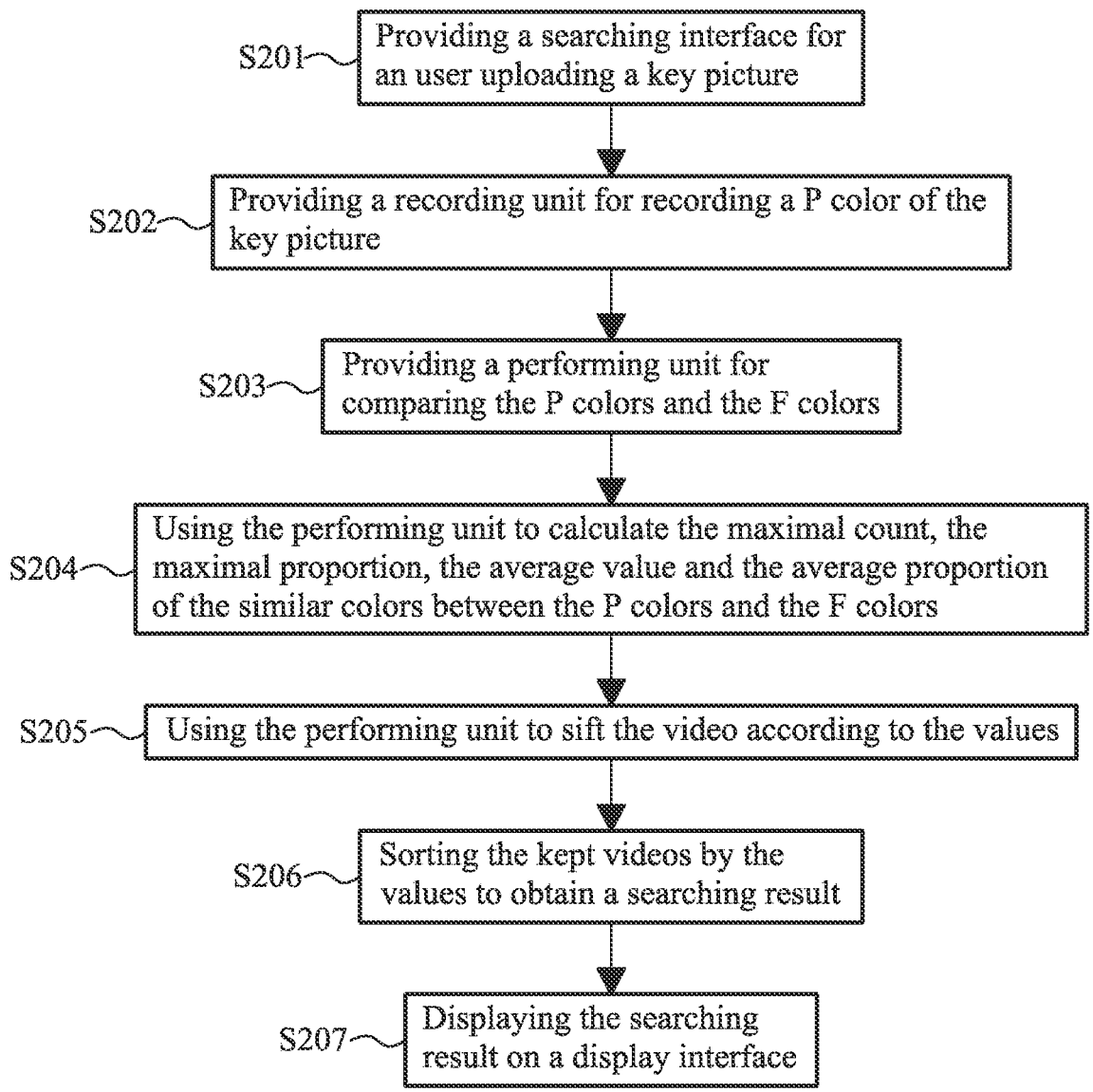
FIG. 4 is a flow chart of the video searching method in an embodiment according to the invention.

Refer to FIG. 4, which is the flow chart of an embodiment of the video searching method according to the present invention. After taking Step S101 to Step S104, the database which contains the F colors of the videos is built. The video searching method includes:

Step S201: providing a searching interface for an user uploading a key picture and searching for the videos.

Step S202: the recording unit recording the P colors of the key picture. Especially, the values of the F colors in Step S103 and the P colors do not need to directly use the RGB color space where each component has 256 levels or other common used color spaces. Instead, the performing unit converts the F colors and the P colors based on a specific quantization function to simplify the stored data and shorten the time of comparing the F colors and the P colors. For example, the RGB values of three blue colors are (152, 203, 255), (153, 204, 255) and (154, 205, 255). If without RGB values, the three colors cannot be distinguished by human eyes directly. Thus, the performing unit converts these three colors with 100 as the full scale. In this way, the values of all the colors are quantized into (60, 80, 100), so the three blue colors can be simplified and regarded as the same color, which greatly reduces the time of comparing.

In a preferable embodiment, when recording a key picture, the key picture is converted into an unified format, such as unifying the resolution or height and width of the key picture to make it the same as that of the key frame picked in Step S103, so as to accelerate the follow-up operations.

Figure 5:
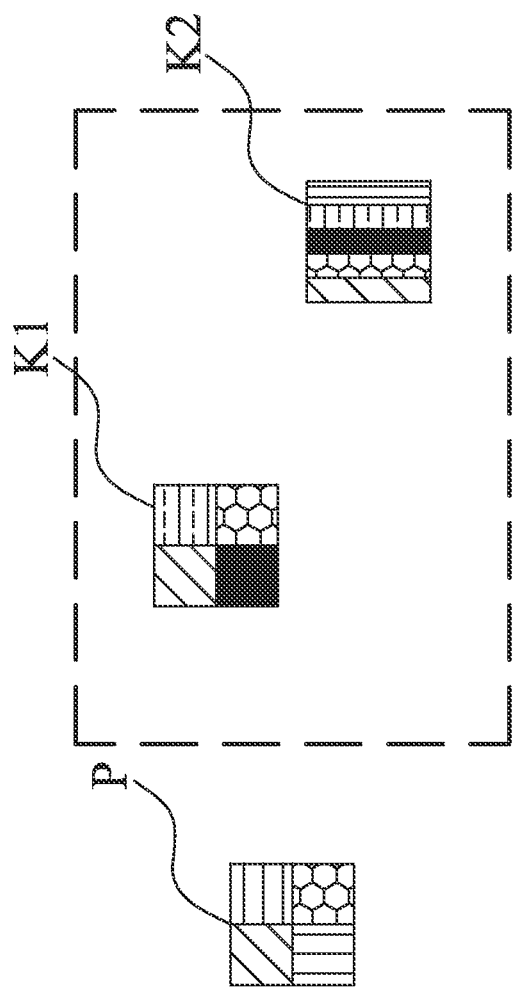
FIG. 5 is a schematic view of comparing the key picture and the key frame in an embodiment of the invention.

Step S203: the performing unit comparing the P colors in a key picture and the F colors in a key frame to determine a similar color count between the key picture and the key frame, and a proportion thereof in F colors of the key frame. Refer to FIG. 5 which is a schematic view of comparing the key picture and the key frame in an embodiment of the present invention. For example, if the P colors in a key picture P are red, blue, yellow and green, and the F colors in a key frame K1 of the uploaded video are red, green, black and purple, the key picture P and the key frame K1 both have red and green, so the similar color count is 2 and the proportion of the similar color count is 50%. If the F colors in another key frame K2 in the uploaded video are red, green, yellow, black and orange, then the key picture P and the key frame K2 both have red, yellow and green, so the similar color count is 3 and the proportion is 60%. In the embodiment of the present invention, the performing unit only compares the P colors of the key picture P and the F colors of the key frame K1 or K2 in the uploaded video to judge whether the similar color count and the proportion of the similar color count in the F colors of the key frame K1 or K2 are larger than zero. The positions do not need to be compared, so the execution time can be shortened and the searching speed is increased.

If the P colors of the key picture and the F colors of all the key frames in each uploaded video in the database do not have any similar color, and the similar color count and the proportion of the similar color count are equal to zero, stop a statistical computing in Step S204 and then jump to Step S207. The result list is zero and an instruction like "Cannot find any similar video" is shown on the display interface.

Step S204: If the P colors of the key picture and the F colors of the key frame in the uploaded video have at least one similar color, and the similar color count and at least one proportion of the similar color count are larger than zero, the performing unit will execute a statistical computing to obtain a statistical list as FIG. 7A including a maximum of the similar color count, a maximum of the proportion of the similar color counts, an average value of the similar color counts and an average value of the proportion of the similar color counts of the videos. The statistical computing is to gather statistics from the data of the video which is generated by being compared in Step S203, and has the similar color count and the proportion thereof. The number of the videos selected by Step S203 does not increase or decrease.

The maximum of the similar color counts and the maximum of the proportions are determined by the same key frame or two different key frames of the video; the average value of the similar color counts and the average value of the proportions are determined by all key frames of the video. That is to say, the average values are overall indexes for each video. They can be the average value of the similar color counts, the average deviation of the similar color counts, and so on.

Figure 6A:
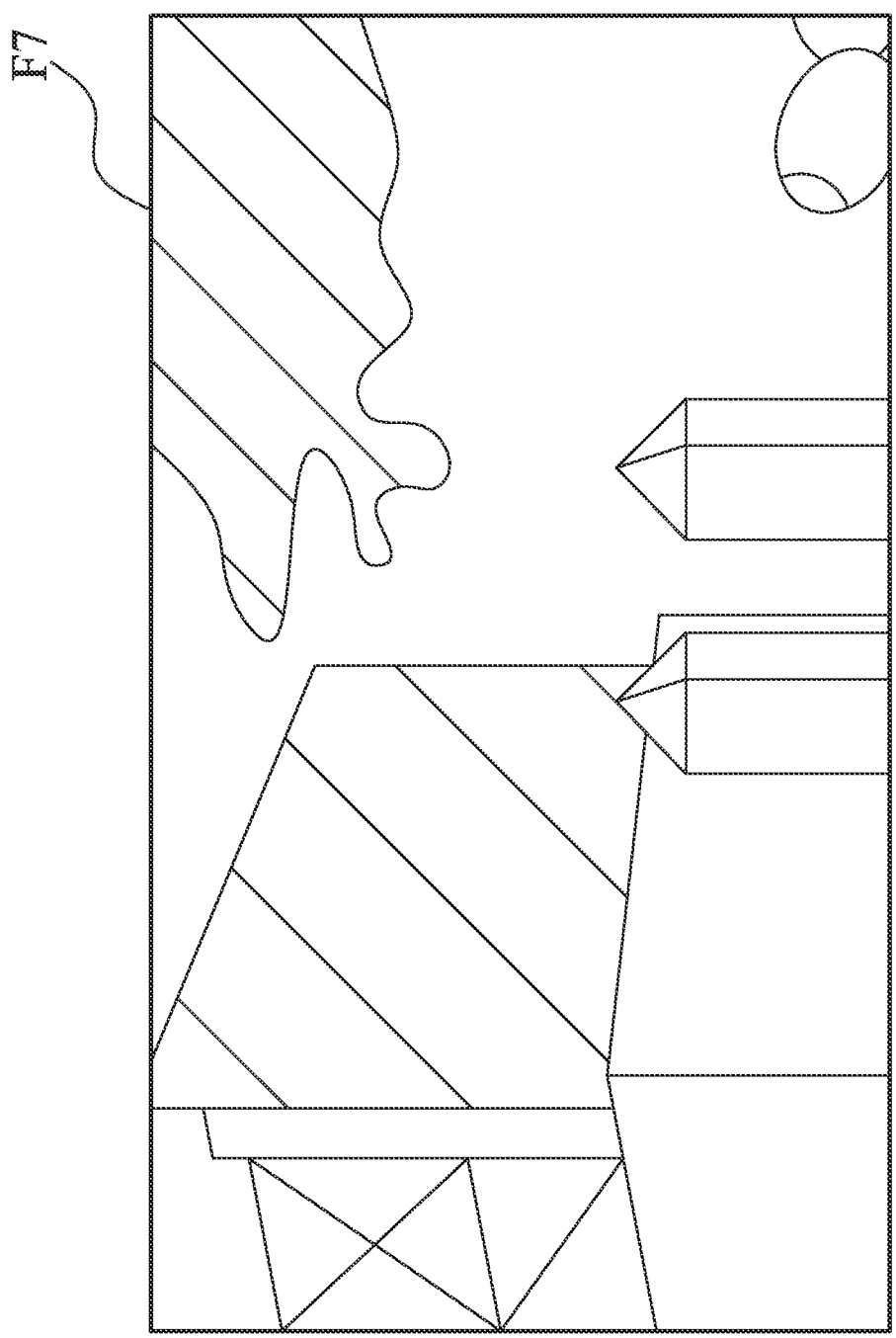

Besides comparing each key frame and the key picture for searching videos, the present invention also takes similar area of the frames into account. Refer to FIG. 6A and FIG. 6B which are the schematic views of the frames with similar area in an embodiment of the present invention. According to the frames F7 and F8, though their pictures have obvious differences, they can be still judged to be continuous pictures, because they display the same scene. Thus, the frames F7 and F8 have a similar area. If the similar color counts of the similar area are larger than zero, these similar color counts will approximate to double. This makes the overall similarity of the videos be larger that of the videos without similar areas. Such a situation often appears in many different similar videos. Therefore, besides calculating the maximum of the similar color counts in one of the plural key frames and the maximum of the proportions of the similar color counts, the present invention also computes the average value of the similar color counts and the average value of the proportions as a reference index for the whole video.

In an embodiment, each video has a plurality of key frames. The maximum of the similar color counts is defined as a count maximal among the similar color counts of the key frames. The maximum of the proportions of the similar color counts is defined as a proportion maximal among the proportions of the similar color counts of the key frames, and the average value of the similar color counts is generated by computing an average value of the similar color counts for all of the key frames, and the average value of the proportions of the similar color counts is generated by computing an average value of the proportions of the similar color counts for all of the key frames For example, we suppose that an uploaded video has a first key frame, a second key frame and a third key frame, and the F colors of each key frame and the P colors of the key picture have similar colors. If the similar color count of the first key frame and the key picture is 100 and the proportion of the similar color count is 90%, the similar color count of the second key frame and the key picture is 300 and the proportion of the similar color count is 85%, the similar color count of the third key frame and the key picture is 200 and the proportion of the similar color count is 80%, it can be known that the maximum of the similar color counts is 300 and the maximal proportion is 90%. If this embodiment uses the average value as the average value, then the average value of the similar color counts is the average of the three similar color counts; that is, 200, and the average value of the proportions is the average of the three proportions; that is, 85%.

If the uploaded video has only one key frame, the maximum of the similar color counts is equal to the average value of the similar color counts, and the maximal proportion of the similar color counts is equal to the average proportion of the similar color counts. Therefore, if comparing the F colors of the video and the P colors of the key pictures, there is only one key frame and only one similar color count, and the similar color count is 1, and the average value is calculated by taking an average, then the maximum and the average value of the similar color count are both 1. Moreover, the statistical computing that the performing unit computes the average values of similar colors and proportions is not limited to adopt the average values mentioned above, average deviation, root-mean-square value or other calculations can also be used to represent the average values of similar colors and proportions.

Step S205: according to the maximal proportion of the similar color counts, the performing unit sets a threshold value to sift out the similar video from the statistical list. If the maximal proportion of the similar color counts is larger than the threshold value, keep the video in the statistical list, else deleting the video from the statistical list. For the kept videos, the performing unit sets a dynamic threshold value to sift out the more similar video according to the maximum of the similar color counts. If the maximum of the similar color counts is larger than the dynamic threshold value, keep the kept video, else deleting the kept video from the statistical list.

When the performing unit sifts out the video, if both the similar color counts and the proportion of the similar color counts are too low, the videos will be deleted from the statistical list. If all kept videos are deleted, jump to Step S207 to display zero for the result list, and an instruction like "Can not find any similar video" is shown on the display interface. If not, the kept videos are sorted in Step S206.

For example, we suppose there are seven videos which have the same value and the same proportion of the similar color counts via Step S203. After Step S204 the maximal proportion A and the maximum B of the similar color counts can be obtained. The average value C of the similar color counts is taken as the average value, and the average proportion D of the similar color counts is the average proportion. Refer to FIG. 7A to FIG. 7D which are schematic views of sifting a plurality of compared videos in the statistical list according to an embodiment of the present invention. First of all, sort the videos sequentially by the maximal proportion A of the similar color counts from high to low. The performing unit sets the threshold value as 50 and deletes the less similar videos in the statistical list by rounding. If the maximal proportion A of videos 1-5 is larger than the threshold value, keep them, else deleting them from the statistical list. Then sort the kept videos by the maximum B of the similar color counts from high to low as shown in FIG. 7C. Next, as FIG. 7D shows, according to the maximum B of the similar color counts, the performing unit sets the dynamic threshold value as 2500 in this embodiment. The maximum B of the similar color counts in videos 1, 2 and 4 is larger than the dynamic threshold value, then keep videos 1, 2 and 4, else deleting them from the statistical list. Sort the kept videos by the average value C of the similar color counts from high to low. Finally, sort the above sorted videos again by the average value C of the proportions of the similar color counts from high to low.

Step S206: the performing unit sorting the kept videos by the average value of the similar color counts and the average value of the proportion of the similar color counts to obtain a result list as FIG. 7F.

As FIG. 7E and FIG. 7F show, the average value C of the similar color counts is rounded. Then sort the videos 1, 2 and 4 by the average value C of the similar color counts. According to the average proportion D of the similar color counts, a sort in FIG. 7F is obtained, and the order of similar videos is 2, 1 and 4.

Step S207: providing a display interface to display the result list which is the videos 2, 1 and 4 sequentially from top to bottom on the display interface.

In an embodiment, the database includes a relevant video related to the video. Bothe the video and the relevant video thereof have a same name or key words, such as the previous or next episode. Therefore, for displaying the result list on the display interface, the performing unit searches out the relevant video through the same name or key words as the video, and the display interface displays the relevant video in the result list.

Noticeably, the video searching method of the present invention is not constrained by the executing order of the above steps. The steps can be adjusted as long as the purpose of the present invention is achieved.

In sum, the video searching method of the present invention can use a key picture to quickly and conveniently search similar videos without complex calculations.

The foregoing description of the preferred embodiment of the invention has been presented or purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention is defined by the claims appended hereto and their equivalents in which all terms are meant in their broadest reasonable sense unless otherwise indicated. Therefore, the term "the invention," "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A video searching method, applied in a computer comprising a database, a searching interface, a recording unit, a performing unit, a display interface, an uploading interface, a picking unit and a conversion unit which are electrically connected to each other, the video searching method comprising:

storing in said database at least one video therein, wherein each the video comprises at least one key frame, and each the key frame comprises a first source color;

uploading a key picture via said searching interface, wherein the key picture comprises a second source color;

recording in said recording unit the second source color of the key picture;

in said performing unit comparing the second source color and the first source color, and thereby determining a similar color count between the key picture and each the key frame, and a proportion of the similar color count in each the key frame;

if the similar color count and the proportion of the similar color count are larger than zero, the performing unit generating a statistical list comprising a maximum of the similar color count, a maximum of the proportion of the similar color count, an average value of the similar color count and an average value of the proportion of the similar color count of each the video;

the performing unit sifting out at least a sifted video from the statistical list according to the maximum of the similar color count and the maximum of the proportion of the similar color count;

after sifting out the sifted video from the statistical list, the performing unit sorting the sifted video in order by the average value of the similar color count and the average value of the proportion of the similar color count to obtain a result list; and displaying the result list via said display interface.

2. The video searching method of claim 1, wherein the steps of the performing unit sifting out the sifted video comprise:

providing a threshold value;

the performing unit keeping the video listed in the statistical list if the maximum of the proportion of the similar color count of the video is larger than the threshold value, and deleting the video from the statistical list if the maximum of the proportion of the similar color count of the video is less than the threshold value;

providing a dynamic threshold value for a kept video sifted out through the threshold value; and the performing unit keeping the kept video in the statistical list if the maximum of the similar color count of the kept video is larger than the dynamic threshold value, and deleting the kept video from the statistical list if the maximum of the similar color count of the kept video is less than the dynamic threshold value.

3. The video searching method of claim 1, further comprising steps of:

the uploading interface uploading the video;

the picking unit picking the key frame in the uploaded video; and the recording unit recording the first source color of the key frame and storing the first source color in the database.

4. The video searching method of claim 1, further comprising a step of: the conversion unit converting the video of the database into a network video format, and transforming each the key frame thereof into an unified format.

5. The video searching method of claim 1, wherein if the similar color count and the proportion of the similar color count are zero after the performing unit comparing the second source color and the first source color, the result list is displayed as zero.

6. The video searching method of claim 1, wherein the performing unit sifting out the sifted video from the statistical list comprises a step of: if the performing unit deletes all videos from the statistical list, the result list is displayed as zero.

7. The video searching method of claim 1, wherein each the video has a plurality of key frames, the maximum of the similar color count is defined as a count maximal among the similar color counts of the key frames, and the maximum of the proportion of the similar color count is defined as a proportion maximal among the proportions of the similar color counts of the key frames, and the average value of the similar color count is generated by computing an average value of the similar color counts for all of the key frames, and the average value of the proportion of the similar color count is generated by computing an average value of the proportions of the similar color counts for all of the key frames.

8. The video searching method of claim 1, wherein each the video has only one key frame, the maximum of the similar color count is equal to the average value of the similar color count, and the maximum of the proportion of the similar color count is equal to the average value of the proportion of the similar color count.

9. The video searching method of claim 1, wherein the database comprises a relevant video related to the video, both the video and the relevant video thereof have a same name or a same key word, and the step of displaying the result list on the display interface comprises: the performing unit searching out the relevant video from the database through the same name or the same key word, and the display interface listing the relevant video in the result list.

10. The video searching method of claim 1, further comprising a step of: before comparing the second source color and the first source color, the performing unit converting the first source color and the second source color into a simplified data according to a specific quantization function.

* * * * *